United States Patent
Chang et al.

(10) Patent No.: US 11,340,733 B2
(45) Date of Patent: May 24, 2022

(54) TOUCH SENSITIVE PROCESSING APPARATUS AND TOUCH SYSTEM FOR DETECTING ELECTRICAL SIGNALS AND METHOD THEREOF

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/139,404

(22) Filed: Dec. 31, 2020

(65) Prior Publication Data
US 2021/0200416 A1 Jul. 1, 2021

(30) Foreign Application Priority Data
Dec. 31, 2019 (TW) .................................. 108148744

(51) Int. Cl.
*G06F 3/041* (2006.01)
*G06F 3/044* (2006.01)

(52) U.S. Cl.
CPC ........ *G06F 3/04182* (2019.05); *G06F 3/0442* (2019.05); *G06F 3/0445* (2019.05); *G06F 3/04162* (2019.05); *G06F 3/04166* (2019.05)

(58) Field of Classification Search
CPC ............. G06F 3/04162; G06F 3/04166; G06F 3/04182; G06F 3/0442; G06F 3/0445
See application file for complete search history.

(56) References Cited

U.S. PATENT DOCUMENTS

| 2013/0155014 A1* | 6/2013 | Yeh | G06F 3/0488 345/174 |
| 2014/0240259 A1* | 8/2014 | Park | G06F 3/0416 345/173 |
| 2016/0004338 A1* | 1/2016 | Hsu | G06F 3/03545 345/173 |

FOREIGN PATENT DOCUMENTS

| CN | 104007875 | 8/2014 |
| TW | 201 602846 | 1/2016 |

* cited by examiner

*Primary Examiner* — Chun-Nan Lin
(74) *Attorney, Agent, or Firm* — WPAT, PC (57) ABSTRACT

A method for detecting electrical signals is provided. The method comprising: detecting periodically via a touch panel touching or approximating events and electrical signals according to a first period, wherein the electrical signals are emitted by an electrode of a transmitter touching or approximating the touch panel; performing multiple electrical signal detections during an electrical signal scanning period, after the electrical signals are detected in a first time, in order to detect the electrical signals in a second time; calculating a period of the electrical signal transmission of the transmitter according to the first time and the second time; and detecting periodically via the touch panel touching or approximating events and electrical signals according to the period of the electrical signal transmission, wherein one of the first period and the period of the electrical signal transmission is not an integer multiple of another of the first period and the period of the electrical signal transmission.

16 Claims, 4 Drawing Sheets

TOUCH SENSITIVE PROCESSING APPARATUS AND TOUCH SYSTEM FOR DETECTING ELECTRICAL SIGNALS AND METHOD THEREOF

CROSS REFERENCE TO RELATED PATENT APPLICATION

This patent application is based on a Taiwan, R.O.C. patent application No. 108148744 filed on Dec. 31, 2019.

FIELD OF THE INVENTION

The present invention relates to stylus, and more particularly, to methods for detecting electrical signals actively emitted by a stylus.

BACKGROUND OF THE INVENTION

A stylus usually transmits modulated electrical signals periodically, which means how often the stylus transmits electrical signals. The touch sensitive processing apparatus can measure electrical signals induced by touch electrodes of a touch panel or a touch screen and demodulate the received electrical signals to calculate a position where the stylus touching the touch panel or screen and to extract messages carried in the electrical signals. However, it is required to synchronize with a transmitting timing of the electrical signals in order to demodulate the electrical signals. The present invention tries to solve a problem of how a touch sensitive processing apparatus passively detect and process the electrical signals and prevent mistaking electromagnetic interferences as the electrical signals emitted by the stylus.

SUMMARY OF THE INVENTION

According to one embodiment of the present application, a method for detecting electrical signals is provided. The method comprising: detecting periodically via a touch panel touching or approximating events and electrical signals according to a first period, wherein the electrical signals are emitted by an electrode of a transmitter touching or approximating the touch panel; performing multiple electrical signal detections during an electrical signal scanning period, after the electrical signals are detected in a first time, in order to detect the electrical signals in a second time; calculating a period of the electrical signal transmission of the transmitter according to the first time and the second time; and detecting periodically via the touch panel touching or approximating events and electrical signals according to the period of the electrical signal transmission, wherein one of the first period and the period of the electrical signal transmission is not an integer multiple of another of the first period and the period of the electrical signal transmission.

According to an embodiment of the present invention, a touch sensitive processing apparatus for detecting electrical signals is provided. The touch sensitive processing apparatus for detecting electrical signals comprising: a sensing circuit module configured to sense electrical signals via first electrodes in parallel to a first axis and second electrodes in parallel to a second axis of a touch panel, wherein the electrical signals are emitted by an electrode of a transmitter touching or approximating the touch panel; and a processor module configured to execute instructions stored in non-volatile memory to fulfill the following steps: detecting periodically via the touch panel touching or approximating events and electrical signals according to a first period; performing multiple electrical signal detections during an electrical signal scanning period, after the electrical signals are detected in a first time, in order to detect the electrical signals in a second time; calculating a period of the electrical signal transmission of the transmitter according to the first time and the second time; and detecting periodically via the touch panel touching or approximating events and electrical signals according to the period of the electrical signal transmission, wherein one of the first period and the period of the electrical signal transmission is not an integer multiple of another of the first period and the period of the electrical signal transmission.

According to one embodiment of the present application, a touch system is provided. The touch system may comprise the aforementioned touch panel, the touch sensitive processing apparatus and the transmitter.

According to the touch sensitive processing method, apparatus and touch system, the electrical signals transmitted by a transmitter can be efficiently detected and processed. And it also prevents mistaking electromagnetic interferences as the electrical signals emitted by the stylus.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Figure 1:
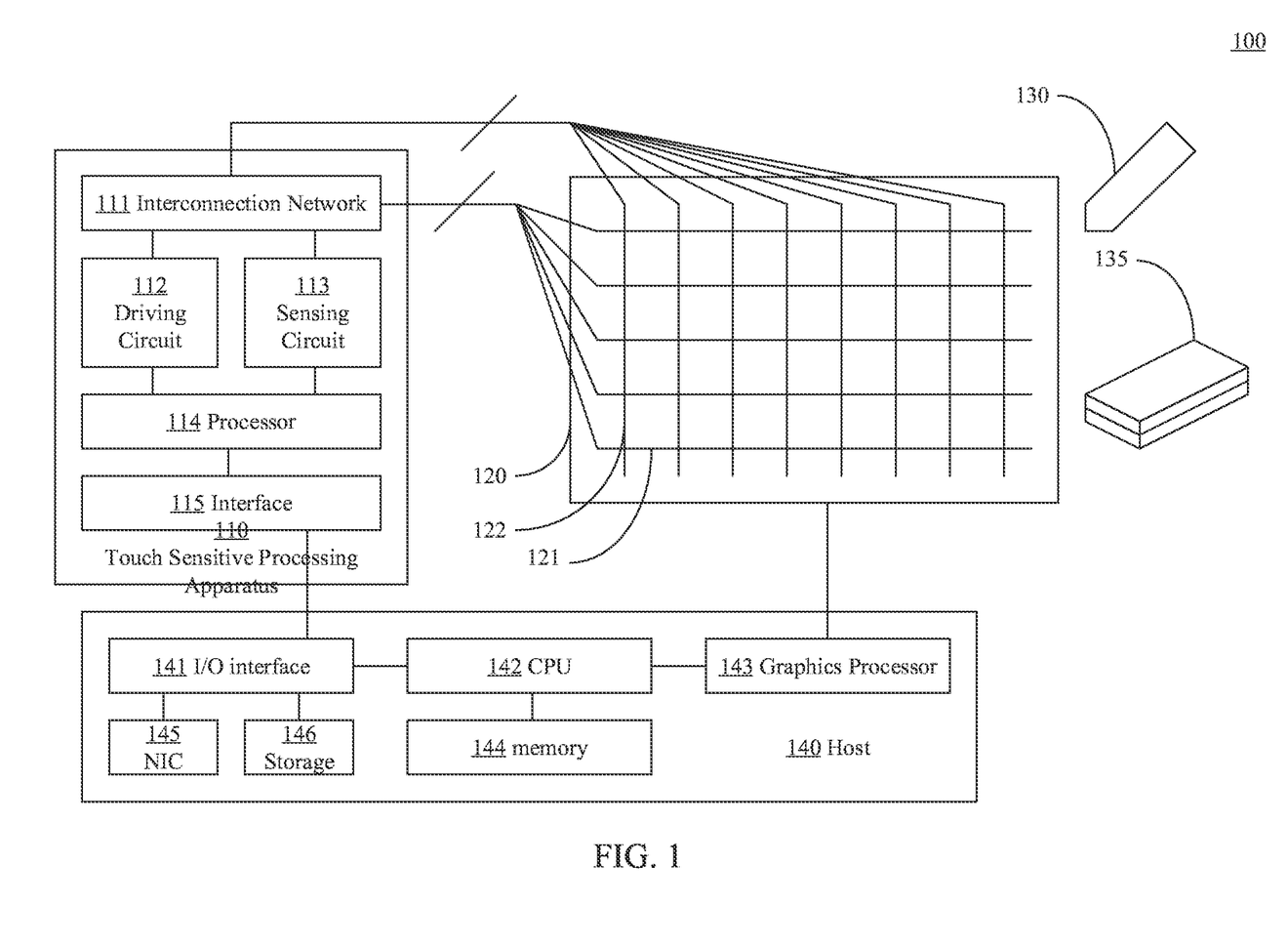
FIG. 1 is a diagram shows a touch system in accordance with an embodiment of the present application.

Please refer to FIG. 1, which is a diagram shows a touch system 100 in accordance with an embodiment of the present application. The touch system may be a desktop, laptop, pad type personal computer, industrial controller computer, smartphone or any other computer system having touch sensitive functions.

The touch system 100 may comprises a touch sensitive processing apparatus 110, a touch panel or screen 120 and a host 140 which are coupled to the touch sensitive processing apparatus 110, respectively. The touch system 100 may further comprises one or more styluses 130 and/or electronic board erasers 135. Hereinafter, the touch panel or screen 120 can be collectively called after the touch screen 120. However, in the embodiments which are lack of display functions, person having ordinary skill in the art can understand the so-called touch screen is a kind of a touch panel.

The touch screen 120 comprises a plurality of first electrodes 121 in parallel to a first axis and a plurality of second electrodes 122 in parallel to a second axis. One f the first electrodes 121 may intersect with the plurality of second electrodes 122 in order to form multiple sensing points or sensing areas. In some embodiments, the present application may refer the first electrodes 121 as first touch electrodes 121. It may also refer the second electrodes 122 as second touch electrodes 122. The present application also collectively refers the first electrodes 121 and the second electrodes 122 as touch electrodes. In some embodiments with touch screen 120, the first electrodes 121 and the second electrodes 122 are made of transparent material. The first electrodes 121 and the second electrodes 122 may be disposed in one electrode layer. Multiple conductive plates of the first electrodes 122 or the second electrodes are connected by bridges. The first electrodes 121 and the second electrodes 122 may be arranged in two overlapped electrode layers. Unless special descriptions, the present application can be applicable to embodiments with one or multiple electrode layers. The first axis is usually perpendicular to the second axis. However, the present application does not limit that the first axis must be perpendicular to the second axis. In one embodiment, the first axis is a horizontal axis or a refresh axis of the touch screen 120.

The touch sensitive processing apparatus 110 may include following hardware circuit modules: an interconnection network module 111, a driving circuit module 112, a sensing circuit module 113, a processor module 114 and an interface module 115. The touch sensitive processing apparatus 110 may be implemented in a single integrated circuits which may include one or more dies. It may be realized by multiple integrated circuits and an interconnection electronic board carries the multiple integrated circuits. The touch sensitive processing apparatus 110 and the host 140 may be implemented in the same integrated circuits or in the same die. In other words, the present application does not limit hot to implement the touch sensitive processing apparatus 110.

The interconnection network module 111 may be configured to connect the plurality of the first electrodes 121 and/or the plurality of the second electrodes 122 of the touch screen 120. The interconnection network module 111 may receive a control command from the processor 114 module and connect the driving circuit module 112 and any one or more of the touch electrodes. It may be configured to connect the sensing circuit module 113 and any one or more of the touch electrodes. The interconnection network module 111 may comprises one multiplexer or a combination of multiplexers to fulfill the aforementioned functions.

The driving circuit 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise clock generator, frequency divider, frequency multiplier, phase lock loop, power amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor module 114 may comprises processors widely adopted in the industry such as 8051 series, Intel i960 series, ARM Cortex-M series and etc. The present application does not limit types and numbers of processors included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other modules of the touch sensitive processing apparatus 110. These instructions may include input/output interfaces of the processor module 114 to control other modules. Other modules may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the modules and the instructions.

The interface module 115 may include kinds of serial or parallel bus, such as universal serial bus (USB), I²C, peripheral component interconnect (PCI), PCI-Express, IEEE 1394 and other industrial standard input/output interface. The touch sensitive processing apparatus 110 connects to the host 140 via the interface module 115.

The touch system 100 may comprise one or more styli 130 and/or touch erasers 135. The stylus 130 and touch eraser 136 may be transmitters which emit electrical signals. The transmitters may include active transmitter which actively emits electrical signals or passive transmitter which emits electrical signals in response to outside electrical signals. The stylus 130 and touch eraser 136 may comprise one or more electrodes which is configured to receive electrical signals from the touch screen synchronously or asynchronously, or to transmit electrical signals to the touch screen synchronously or asynchronously. The electrical signals may be modulated according to one or more of the aforementioned modulation methods.

The stylus 130 or touch eraser 135 may be conductor which is configured to transmit driving signals or to be grounded via user's hand or body. The stylus 130 or touch eraser 135 may be wired or wirelessly connected to an I/O interface module 141 of the host 140 or any other underlying modules of the I/O interface module 141.

The touch sensitive processing apparatus 110 may detect one or more external conductive objects such as fingers, palms or passive styli 130 or touch erasers 135 or styli 130 or touch erasers 135 emitting electrical signals via the touch screen 120. The touch sensitive processing apparatus 110 may utilize mutual-capacitance or self-capacitance principles to detect external conductive objects. The styli 130 or touch erasers 135 and touch sensitive processing apparatus 110 may use the aforementioned modulation and demodulation methods to transmit message via the electrical signals. The touch sensitive processing apparatus 110 may detect one or more positions where the stylus 130 or touch erasers 135 touches or approximates the touch screen 120, status or sensors (pressure sensor or button) onboard the stylus 130 or touch eraser 135, orientation angle or inclination angle of the stylus 130 or touch erasers 135 with respect to the touch screen 120 and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's x86 and x64 instruction set architecture (ISA) processors, Apple, Qualcomm, Mediatek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware modules. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 2:
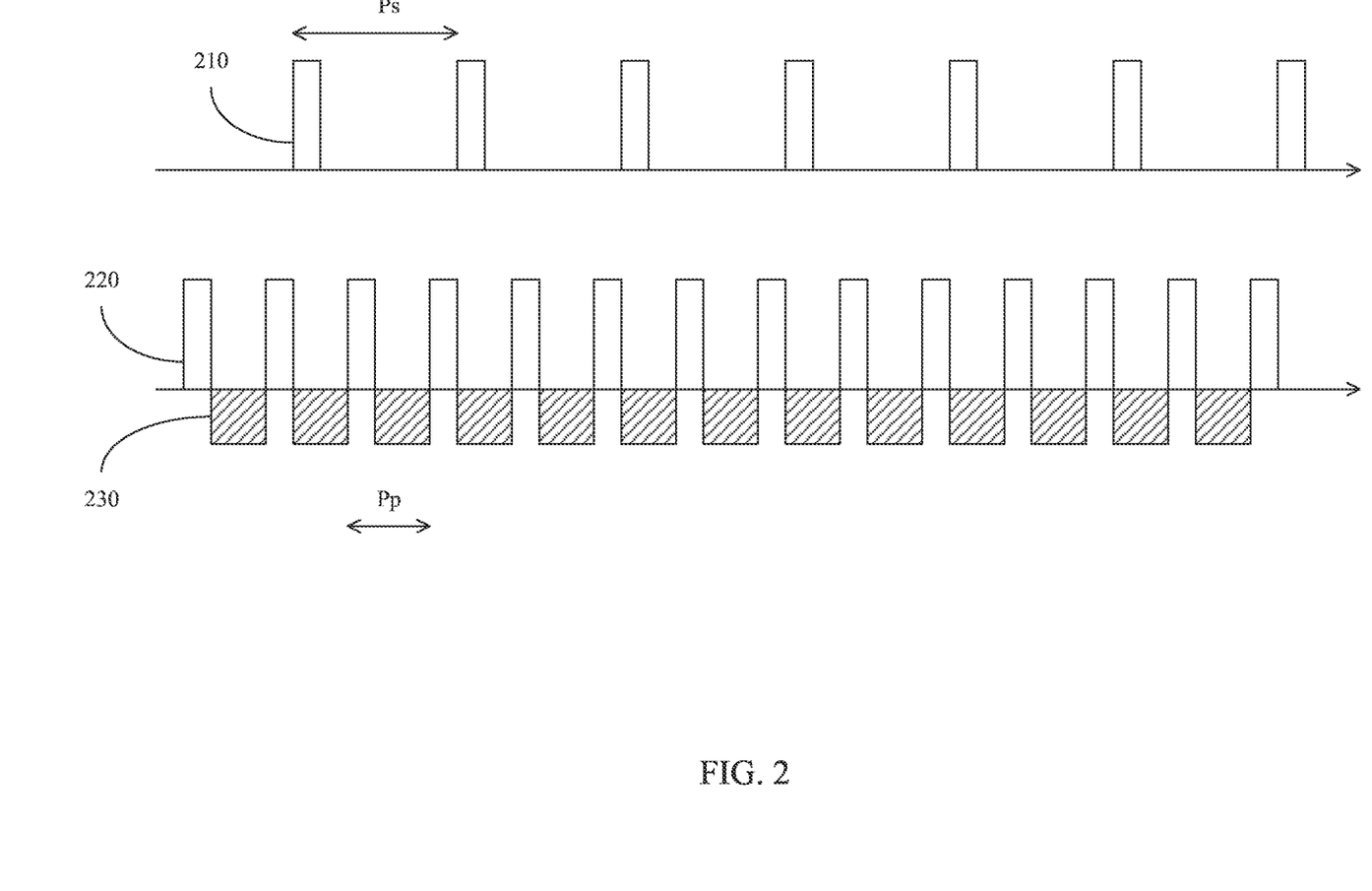
FIG. 2 is a timing diagram shows a touch sensitive processing apparatus tries to synchronize with a stylus.

Please refer to FIG. 2, which is a timing diagram shows a touch sensitive processing apparatus tries to synchronize with a stylus. Two time axis are shown in FIG. 2. Electrical signals transmission periods 210, when the stylus 130 actively transmits electrical signals, are denoted on the upper time axis. Electrical signals reception periods 220, when the touch sensitive processing apparatus detects the electrical signals, are denoted on the lower time axis. In the present application, the stylus transmits the electrical signals via an electrode at a tip of the stylus or near the tip. When the electrode approaches the touch panel, one of the plurality of first electrodes 121 or the plurality of second electrodes 122 would induce the electrical signals. The sensing circuit module 113 of the touch sensitive processing apparatus 110 can measure the electrical signals via the touch electrode.

The touch sensitive processing apparatus 110 may be aware of the modulation method of the electrical signals so as the sensing circuit module 113 can demodulate the received electrical signals according to the modulation method. Because the touch sensitive processing apparatus 110 may not distinguish the electrical signals from noises or electromagnetic interferences, the stylus usually transmits a modulated signal known to the touch sensitive processing apparatus 110. The modulated signal may be referred as a preamble signal such that the touch sensitive processing apparatus 110 may exclude noises. The signals may include not only the preamble signal but also optional suffix signal for carrying status of the stylus 130. For examples, pressure on the tip of the stylus, a state of a button of the stylus, an identity of the stylus, a model identity of the stylus and etc. Different models of styluses may have different preamble signals. And two different styluses of the same model may have different preamble signals.

The touch sensitive processing apparatus 110 may have touching or approximating event detection periods 230 between the electrical signal detection periods 220 for detecting external conductive objects. No matter which one of self-capacitance or mutual-capacitance detection principles is used, it requires at least one of the touch electrodes 121 or 122 to transmitting driving signals. Because the driving signals and the electrical signals may interferes each other, the electrical signal detection period 220 and the touching or approximating event detection period 230 need to be separated. This implies that these two periods cannot be overlapped in the time axis.

In one embodiment, if the modulation method of the electrical signals is different from the modulation method of driving signals such that the sensing circuit module 113 can distinguish the electrical signals and the driving signals, the electrical signal detection period 220 and touching or approximating event detection period 230 may be overlapped in the time axis. For example, if the electrical signals and the driving signals are modulated by orthogonal pseudo random number codes, the touch sensitive processing apparatus 110 may use code division multiplexing access technique to distinguish the electrical signals and the driving signals. This can let the electrical signal detection period 220 and the touching or approximating event detection period 230 happen concurrently. And no matter whether the electrical signal detection period 220 and the touching or approximating event detection period 230 happen concurrently or not, in order to increase a report rate of the touching or approximating event, the touch sensitive processing apparatus 110 may have the touching or approximating event detection period 230 for detecting external conductive object between the electrical signal detection periods 220.

In the embodiment as shown in FIG. 2, a period Ps that stylus 130 transmits the electrical signals in every six units of time. And a period Pp that the touch sensitive processing apparatus 110 detects the electrical signals in every 3 units of time. Since one of these two periods Ps and Pp is an integral multiple of another one, for example, 6 is a double of 3, the touch sensitive processing apparatus as shown in FIG. 2 never detects the electrical signals. This is the situation that the touch sensitive processing apparatus 110 needs to avoid.

Figure 3:
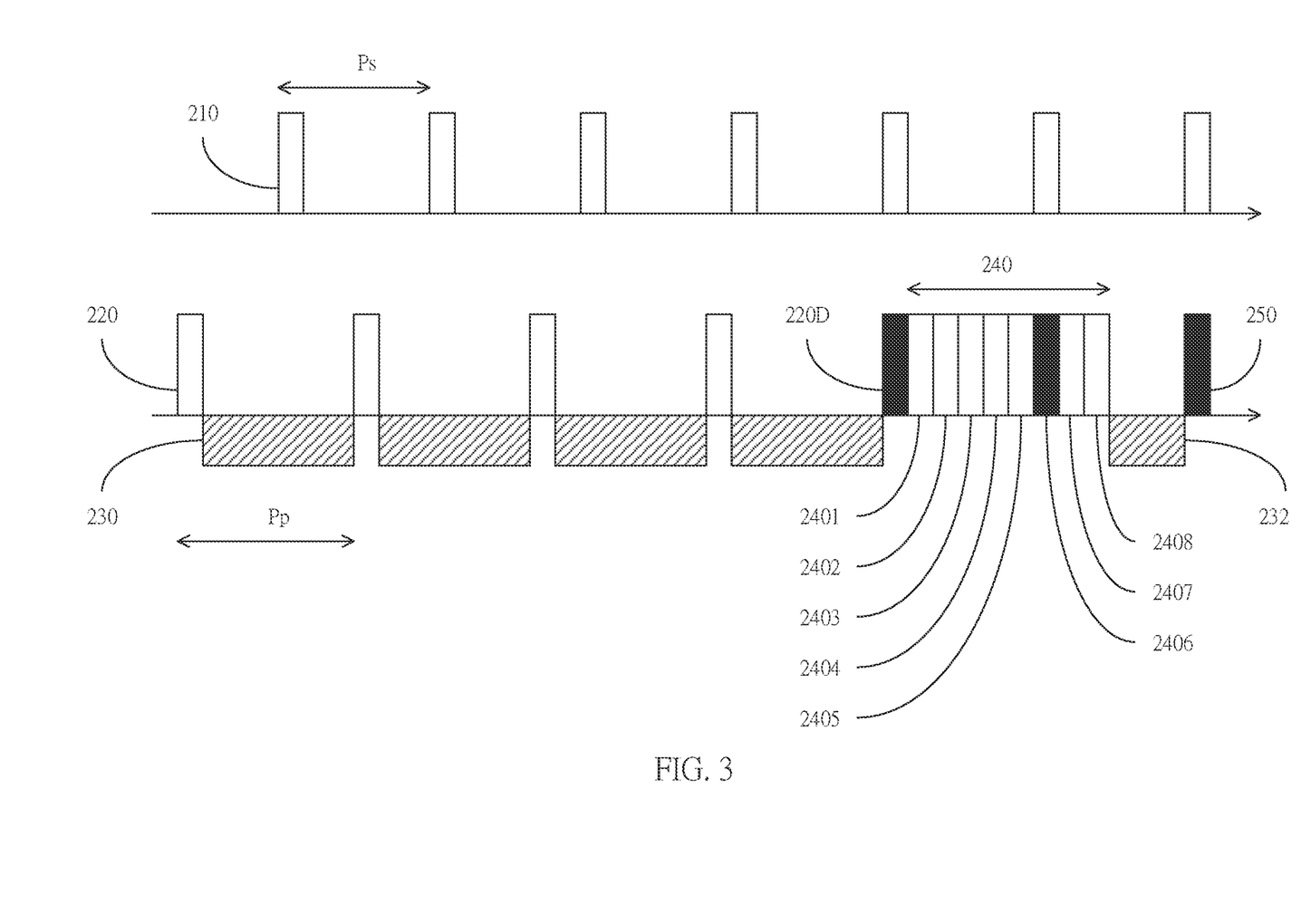
FIG. 3 is a timing diagram illustrates a touch sensitive processing apparatus tries to synchronize with a stylus in accordance with an embodiment of the present invention.

Please refer to FIG. 3, which is a timing diagram illustrates a touch sensitive processing apparatus tries to synchronize with a stylus in accordance with an embodiment of the present invention. The period Ps as shown in FIG. 3 is still six units of time. However, the period Pp that the touch sensitive processing apparatus 110 detects the electrical signals is 7 units of time. Hence, the touching or approximating event detection period 230 can last for six units of time. Since one of these two periods Ps and Pp is not an integral multiple of the another one, the touch sensitive processing apparatus 110 can detect the electrical signals eventually after some time. In the embodiment as shown in FIG. 3, the touch sensitive processing apparatus 110 detects the electrical signals successfully in the fifth electrical signal detection period 220.

In one embodiment, when the period Ps is known to the touch sensitive processing 110 and the electrical signals are successfully detected, the touch sensitive processing apparatus 110 may arrange the next electrical signal detection period 220 according to the period Ps. For example, in the embodiment as shown in FIG. 3, the period 2406 is arranged as the next electrical signal detection period 220. However, the electrical signals detected successfully are caused by electromagnetic interferences. Subsequently, the electrical signals cannot be detected in the next electrical signal detection period 220. The touch sensitive processing apparatus may switch the period from the period Ps back to the period Pp if it cannot detect electrical signals in N sequential electrical signal detection periods. Hence, it guarantees the touch sensitive processing apparatus 110 can detect true electrical signals in some time.

Alternatively, after successfully detecting the electrical signals, the touch sensitive processing apparatus 110 may cancel the planned touching or approximating event detection period 230 and arrange an electrical signal scanning period 240. During the electrical signal scanning period 240, multiple rounds of electrical signals detection may be executed continuously. For example, as shown in the embodiment as shown in FIG. 3, the electrical signal scanning period 240 comprises periods 2401~2408. In each one of the eight periods 2401~2408, one round of electrical signal detection is performed.

Figure 4:
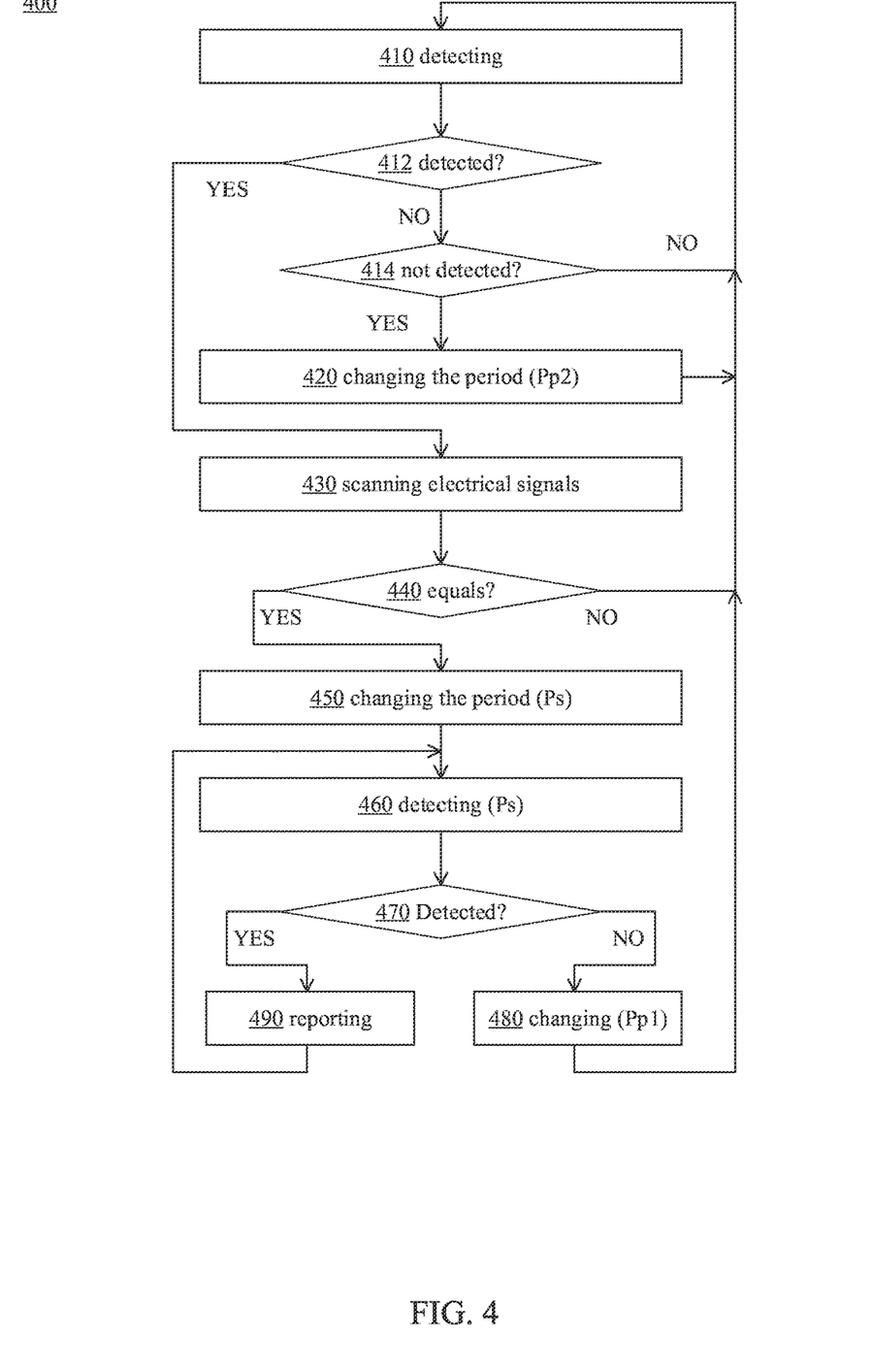
FIG. 4 is a flowchart diagram depicts a method for detecting electrical signals in accordance with an embodiment of the present invention.

In one embodiment, in case the period Ps is known to the touch sensitive processing apparatus 110, the electrical signal scanning period 240 may include at least the period 2406 which is in one period Ps from the electrical signal detection period 220D. The electrical signal scanning period 240 may also include the period 2407 which is in one period Pp from the electrical signal detection 220D. In the embodiment as shown in FIG. 4, the electrical signal scanning period 240 may further include the period 2408.

If the touch sensitive processing apparatus 110 detects un-expected electrical signals in some periods of the electrical signal scanning period 240, this implies the separation between the electrical signal detection period 220D and the newly detected period is not exactly the period Ps. In other words, if the electrical signals are detected during the periods 2401~2405, 2407 and 2408, one or both of the electrical signals detected in the electrical signal detection period 220D and the newly detected period are electromagnetic interferences. The touch sensitive processing apparatus 110 may switch the period from the period Ps back to the period Pp in order to detect real electrical signals in some time.

The next electrical signal detection period 220 after the period is switched back to the period Pp may be arranged immediately or randomly a time after the last period that the electrical signals are detected. As long as that one of the periods Ps and Pp is not an integral multiple of the another one, the touch sensitive processing apparatus 110 can detect the electrical signals in some time.

In one embodiment, the touch sensitive processing apparatus 110 may handle multiple styluses, one of a period Ps of each of the styluses and the period Pp is not an integral multiple of the another one. Therefore, the touch sensitive processing apparatus 110 is allowed to be unknown to the period of the detected electrical signals. In the embodiment as shown in FIG. 3, when the touch sensitive processing apparatus 110 detects the electrical signals during the period 2406 of the electrical signal scanning period 240 and does not detect the electrical signals during the periods 2401~2405, 2407 and 2408, the touch sensitive processing apparatus 110 may conclude the period Ps of the stylus 130. Therefore, the touch sensitive processing apparatus 110 may be arranged to detect touching or approximating events during the period 232 immediately after the electrical signal scanning period 240. Subsequently, the touch sensitive processing apparatus 110 may be arranged to detect the electrical signals during the period 250 which is separated from the period 2406 by one period Ps. When the electrical signals are detected during the period 250, the touch sensitive processing apparatus 110 can confirm the period Ps determined according to the electrical signal scanning period 240 is correct. It can use this period Ps to arrange subsequent detections of the electrical signals of the stylus. However, if the electrical signals are not detected during the electrical signal detection period 250, this implies that the previously determined period Ps is wrong. Hence, the touch sensitive processing apparatus 110 may switch the period back from the period Ps to the period Pp so as the touch sensitive processing apparatus 110 can detect the electrical signals in some time. With regard to when the electrical signal detection period 220 is arranged, it is already discussed. No more elaboration here.

In one embodiment, when the tip of the stylus 130 leaves the touch panel 120 for some time, the touch sensitive processing apparatus 110 cannot detect electrical signals during the electrical signal detection periods 250 arranged according to the period Ps. In this situation, the touch sensitive processing apparatus 110 may switch the period back from the period Ps to the period Pp. The reason is shown in FIG. 2. If the stylus 130 changes timings of the transmissions of the electrical signals because of temperature or any other factors, the touch sensitive processing apparatus 110 may not detect the electrical signals during the electrical signal detection periods arranged according to the same period Ps.

In one embodiment, if the touch sensitive processing apparatus 110 does not detect the stylus 130, more proportion of time would be appropriated to the touching or approximating event detection periods 230. In other words, when the electrical signal detection periods 220 are arranged according to the period Pp, a proportion of the touching or approximating event detection periods 230 is higher than that when the electrical signal detection periods 220 are arranged according to the period Ps.

In one embodiment, if the touch sensitive processing apparatus 110 does not detect the stylus 130 for some time, more proportion of time would be appropriated to the touching or approximating event detection periods 230. For example, in the beginning, the touch sensitive processing apparatus 110 enters the electrical signal detection periods 220 every first period Pp1. After passing N electrical signal detection periods 220 which are separated by the first period Pp1, the touch sensitive processing apparatus enters the electrical signal detection periods 220 every second period Pp2, where N is a positive integer larger than 1 and the second period Pp2 is longer than the first period Pp1. Alternatively, when the stylus 130 is no longer detected, the touch sensitive processing apparatus 110 may detect the electrical signals every first period Pp1. After passing M electrical signal detection periods 220 which are separated by the first period Pp1, the touch sensitive processing apparatus enters the electrical signal detection periods 220 every second period Pp2, where M is a positive integer larger than 1 and N may not equals to M. In one example, it may be assumed that the chance that the stylus 130 returns to the touch panel 120 is higher than the first appear of the stylus 130, M may be larger than N. It is worthy noted that the first period Pp1 or the second period Pp2 is not an integer multiple of the period Ps. Or in reverse, the period Ps is not an integer multiple of the first period Pp1 or the second period Pp2.

Although the embodiments in the present application are applicable to the stylus 130, person having ordinary skill in the art can understand the embodiments can also be applicable to the electronic board eraser 135 which actively transmits electrical signals. The electronic board eraser 135 may include one or more electrodes for actively emitting electrical signals. When the electrode of the electronic board eraser 135 approach the touch panel, the touch sensitive processing apparatus 110 may detect the electrical signal according to one of the touch electrodes 121 or 122 of the touch panel 120.

Please refer to FIG. 4, which is a flowchart diagram depicts a method 400 for detecting electrical signals in accordance with an embodiment of the present invention. The method for detecting electrical signals can be applicable to the touch sensitive processing apparatus 110 as shown in FIG. 1, especially implemented as a program stored in a non-volatile memory for execution of the processor 114 for realizing the steps as shown in FIG. 4. In the beginning, a period of electrical signal detection is set as a first period Pp1.

Step 410: detecting touching or approximating event and electrical signals. It may detect touching or approximating event first, then detect electrical signals. Or it may detect electrical signals first, then concurrently detect touching or approximating event and electrical signals. Or alternatively, it may detect electrical signals first, then detect touching or approximating event. There are several patent applications filed by the Applicant related to how to detect touching or approximating event and electrical signals. These applications may be referenced.

Step 412: determining whether the electrical signals are detected. If detected, the flow goes to the step 430; otherwise, the flow goes back to the step 410 or the optional step 414.

Optional step 414: determining whether the electrical signals are not received for a certain time period. This step can be done by counting the number of periods or counting the time. If the result is positive, the flow may goes to the optional step 420; otherwise, the flow may goes back to the step 410.

Optional step 420: changing the period of electrical signal detection as the second period Pp2.

Step 430: scanning for the electrical signals in order to determine a period P of the electrical signals, i.e., the electrical signals can be detected again in which one of the periods. The electrical signal scanning period 240 as shown in FIG. 3 is an example. If the predetermined period Ps of the electrical signals corresponding to the stylus is already known to the touch sensitive processing apparatus 110, the flow may goes to the optional step 440; otherwise, the flow may goes to the step 450.

Optional step 440: determining whether the period P determined at the step 430 equals to the predetermined period Ps of the electrical signals corresponding to the stylus which is already known to the touch sensitive processing apparatus 110. If they are identical, the flow goes to the step 450; otherwise, the flow goes back to the step 410 if they are different.

Step 450: changing the period of electrical signal detection as the predetermined period Ps.

Step 460: detecting touching or approximating event and electrical signals. At this step, the period of electrical signal detection is already changed to the predetermined period Ps.

Step 470: determining whether the electrical signals are detected. If detected, the flow goes to the step 490; otherwise, the flow goes back to the step 480.

Step 480: changing the period of electrical signal detection as the first period Pp1. Then the flow goes back to the step 410. In an alternative embodiment, changing the period of electrical signal detection as a third period Pp3 which is shorter than the first period Pp1. And one of the third period Pp3 and the predetermined period Ps is not an integer multiple of another.

Step 490: calculating a position of the stylus and/or other information according to the received electrical signals. Then the flow goes back to the step 460.

According to one embodiment of the present application, a method for detecting electrical signals is provided. The method comprising: detecting periodically via a touch panel touching or approximating events and electrical signals according to a first period, wherein the electrical signals are emitted by an electrode of a transmitter touching or approximating the touch panel; performing multiple electrical signal detections during an electrical signal scanning period, after the electrical signals are detected in a first time, in order to detect the electrical signals in a second time; calculating a period of the electrical signal transmission of the transmitter according to the first time and the second time; and detecting periodically via the touch panel touching or approximating events and electrical signals according to the period of the electrical signal transmission, wherein one of the first period and the period of the electrical signal transmission is not an integer multiple of another of the first period and the period of the electrical signal transmission.

In one embodiment, in order to compare with a predetermined period of the transmission of the transistor to make sure that the received electrical signals are not noises or electromagnetic interferences, the method further comprises: after the period of the electrical signal transmission is calculated, comparing the period of the electrical signal transmission with a predetermined period of the transmission of the transmitter; and detecting periodically via the touch panel touching or approximating events and electrical signals according to the period of the transmission of the transmitter, when the period of the electrical signal transmission and the period of the transmission of the transmitter are identical.

In one embodiment, in order to increase a report frequency of touching or approximating event if the transmitter is absent, the method further comprises: detecting periodically via the touch panel touching or approximating events and electrical signals according to a second period, when the electrical signals are not detected for a while, wherein one of the second period and the period of the electrical signal transmission is not an integer multiple of another of the second period and the period of the electrical signal transmission, wherein the second period is longer than the first period.

In one embodiment, in order to make sure of the electrical signals can be received in some time, the method further comprises: when the electrical signals are not detected in said detecting step according to the period of the electrical signal transmission, performing said detecting step according to the first period again.

In one embodiment, in order to prevent detecting periodically appeared electromagnetic interferences, said detecting step according to the first period is randomly arranged in a time interval after said detecting electrical signals according to the period of the electrical signal transmission.

In one embodiment, in order to increase a probability of detecting the transmitter faster, the method further comprises: detecting periodically via the touch panel touching or approximating events and electrical signals according to a third period, when the electrical signals are not detected during said detecting step according to the period of the electrical signal transmission, wherein one of the third period and the period of the electrical signal transmission is not an integer multiple of another of the third period and the period of the electrical signal transmission, wherein the third period is shorter than the first period.

In one embodiment, in order to use a stylus and an electronic board eraser on the touch panel, the transmitter includes one of a stylus and an electronic board eraser.

According to an embodiment of the present invention, a touch sensitive processing apparatus for detecting electrical signals is provided. The touch sensitive processing apparatus for detecting electrical signals comprising: a sensing circuit module configured to sense electrical signals via first electrodes in parallel to a first axis and second electrodes in parallel to a second axis of a touch panel, wherein the electrical signals are emitted by an electrode of a transmitter touching or approximating the touch panel; and a processor module configured to execute instructions stored in non-volatile memory to fulfill the following steps: detecting periodically via the touch panel touching or approximating events and electrical signals according to a first period; performing multiple electrical signal detections during an electrical signal scanning period, after the electrical signals are detected in a first time, in order to detect the electrical signals in a second time; calculating a period of the electrical signal transmission of the transmitter according to the first time and the second time; and detecting periodically via the touch panel touching or approximating events and electrical signals according to the period of the electrical signal transmission, wherein one of the first period and the period of the electrical signal transmission is not an integer multiple of another of the first period and the period of the electrical signal transmission.

In one embodiment, in order to compare with a predetermined period of the transmission of the transistor to make sure that the received electrical signals are not noises or electromagnetic interferences, the processor module is further configured to execute instructions stored in non-volatile memory to fulfill the following steps: after the period of the electrical signal transmission is calculated, comparing the period of the electrical signal transmission with a predetermined period of the transmission of the transmitter; and detecting periodically via the touch panel touching or approximating events and electrical signals according to the period of the transmission of the transmitter, when the period of the electrical signal transmission and the period of the transmission of the transmitter are identical.

In one embodiment, in order to increase a report frequency of touching or approximating event if the transmitter is absent, the processor module is further configured to execute instructions stored in non-volatile memory to fulfill the following steps: detecting periodically via the touch panel touching or approximating events and electrical signals according to a second period, when the electrical signals are not detected for a while, wherein one of the second period and the period of the electrical signal transmission is not an integer multiple of another of the second period and the period of the electrical signal transmission, wherein the second period is longer than the first period.

In one embodiment, in order to make sure of the electrical signals can be received in some time, the processor module is further configured to execute instructions stored in non-volatile memory to fulfill the following steps: when the electrical signals are not detected in said detecting step according to the period of the electrical signal transmission, performing said detecting step according to the first period again.

In one embodiment, in order to prevent detecting periodically appeared electromagnetic interferences, said detecting step according to the first period is randomly arranged in a time interval after said detecting electrical signals according to the period of the electrical signal transmission.

In one embodiment, in order to increase a probability of detecting the transmitter faster, the processor module is further configured to execute instructions stored in non-volatile memory to fulfill the following steps: detecting periodically via the touch panel touching or approximating events and electrical signals according to a third period, when the electrical signals are not detected during said detecting step according to the period of the electrical signal transmission, wherein one of the third period and the period of the electrical signal transmission is not an integer multiple of another of the third period and the period of the electrical signal transmission, wherein the third period is shorter than the first period.

In one embodiment, in order to use a stylus and an electronic board eraser on the touch panel, the transmitter includes one of a stylus and an electronic board eraser.

According to one embodiment of the present application, a touch system is provided. The touch system may comprise the aforementioned touch panel, the touch sensitive processing apparatus and the transmitter.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for detecting electrical signals, comprising:
   detecting periodically via a touch panel touching or approximating events and the electrical signals according to a first period, wherein the electrical signals are emitted by an electrode of a transmitter touching or approximating the touch panel;
   performing multiple electrical signal detections during an electrical signal scanning period, after the electrical signals are detected in a first time, in order to detect the electrical signals in a second time;
   calculating a period of the electrical signal transmission of the transmitter according to the first time and the second time; and
   detecting periodically via the touch panel touching or approximating events and the electrical signals according to the period of the electrical signal transmission of the transmitter,
   wherein the first period is not an integer multiple of the period of the electrical signal transmission of the transmitter and wherein the period of the electrical signal transmission of the transmitter is not an integer multiple of the first period.

2. The method for detecting electrical signals, as claimed in claim 1, further comprises:
   after the period of the electrical signal transmission of the transmitter is calculated, comparing the period of the electrical signal transmission of the transmitter with a predetermined period of the transmission of the transmitter; and
   detecting periodically via the touch panel touching or approximating events and the electrical signals according to the predetermined period of the transmission of the transmitter, when the period of the electrical signal transmission of the transmitter and the predetermined period of the transmission of the transmitter are identical.

3. The method for detecting electrical signals, as claimed in claim 1, further comprises:
   detecting periodically via the touch panel touching or approximating events and the electrical signals according to a second period, when the electrical signals are not detected for a while,
   wherein the second period is not an integer multiple of the period of the electrical signal transmission of the transmitter,
   wherein the period of the electrical signal transmission of the transmitter is not an integer multiple of the second period, and
   wherein the second period is longer than the first period.

4. The method for detecting electrical signals, as claimed in claim 1, further comprises:
   when the electrical signals are not detected in said detecting step according to the period of the electrical signal transmission of the transmitter, performing said detecting step according to the first period again.

5. The method for detecting electrical signals, as claimed in claim 4, wherein said detecting step according to the first period is randomly arranged in a time interval after said detecting the electrical signals according to the period of the electrical signal transmission of the transmitter.

6. The method for detecting electrical signals, as claimed in claim 1, further comprises:
   detecting periodically via the touch panel touching or approximating events and the electrical signals according to a third period, when the electrical signals are not detected during said detecting step according to the period of the electrical signal transmission,
   wherein the third period is not an integer multiple of the period of the electrical signal transmission of the transmitter,
   wherein the period of the electrical signal transmission of the transmitter is not an integer multiple of the third period, and
   wherein the third period is shorter than the first period.

7. The method as claimed in claim 1, wherein the transmitter includes one of followings: a stylus and an electronic board eraser.

8. A touch sensitive processing apparatus for detecting electrical signals, comprising:
   a sensing circuit module configured to sense the electrical signals via first electrodes in parallel to a first axis and second electrodes in parallel to a second axis of a touch panel, wherein the electrical signals are emitted by an electrode of a transmitter touching or approximating the touch panel; and
   a processor module;
   wherein the sensing circuit module detects periodically via the touch panel touching or approximating events and the electrical signals according to a first period;
   wherein once the sensing circuit module detects the electrical signals in a first time, and then performs multiple electrical signal detections during an electrical signal scanning period in order to detect the electrical signals in a second time;
   wherein the processor module calculates a period of the electrical signal transmission of the transmitter according to the first time and the second time; and
   wherein the sensing circuit module detects periodically via the touch panel touching or approximating events and the electrical signals according to the period of the electrical signal transmission of the transmitter, wherein the first period is not an integer multiple of the period of the electrical signal transmission of the transmitter and wherein the period of the electrical signal transmission of the transmitter is not an integer multiple of the first period.

9. The touch sensitive processing apparatus for detecting electrical signals, as claimed in claim 8, wherein the processor module is further configured to execute instructions stored in non-volatile memory to fulfill the followings:
after the period of the electrical signal transmission of the transmitter is calculated, comparing the period of the electrical signal transmission of the transmitter with a predetermined period of the transmission of the transmitter; and
having the sensing circuit module detect periodically via the touch panel touching or approximating events and the electrical signals according to the predetermined period of the transmission of the transmitter, when the period of the electrical signal transmission of the transmitter and the predetermined period of the transmission of the transmitter are identical.

10. The touch sensitive processing apparatus for detecting electrical signals, as claimed in claim 8, wherein the processor module is further configured to execute instructions stored in non-volatile memory to fulfill the followings:
having the sensing circuit module detect periodically via the touch panel touching or approximating events and the electrical signals according to a second period, when the electrical signals are not detected for a while, wherein the second period is not an integer multiple of the period of the electrical signal transmission of the transmitter,
wherein the period of the electrical signal transmission of the transmitter is not an integer multiple of the second period, and
wherein the second period is longer than the first period.

11. The touch sensitive processing apparatus for detecting electrical signals, as claimed in claim 8, wherein the processor module is further configured to execute instructions stored in non-volatile memory to fulfill the followings:
when the electrical signals are not detected in said detecting according to the period of the electrical signal transmission of the transmitter, performing said detecting according to the first period again.

12. The touch sensitive processing apparatus for detecting electrical signals, as claimed in claim 11, wherein said detecting according to the first period is randomly arranged in a time interval after said detecting the electrical signals according to the period of the electrical signal transmission of the transmitter.

13. The touch sensitive processing apparatus for detecting electrical signals, as claimed in claim 8, wherein the processor module is further configured to execute instructions stored in non-volatile memory to fulfill the followings:
having the sensing circuit detect periodically via the touch panel touching or approximating events and the electrical signals according to a third period, when the electrical signals are not detected during said detecting according to the period of the electrical signal transmission of the transmitter,
wherein the third period is not an integer multiple of the period of the electrical signal transmission of the transmitter,
wherein the period of the electrical signal transmission of the transmitter is not an integer multiple of the third period, and
wherein the third period is shorter than the first period.

14. The touch sensitive processing apparatus for detecting electrical signals, as claimed in claim 8, wherein the transmitter includes one of followings: a stylus and an electronic board eraser.

15. A touch system, comprising:
a touch panel, comprising first electrodes in parallel to a first axis and second electrodes in parallel to a second axis; and
a touch sensitive processing apparatus, comprising:
a sensing circuit module configured to sense the electrical signals via the first electrodes and the second electrodes of the touch panel, wherein the electrical signals are emitted by an electrode of a transmitter touching or approximating the touch panel; and
a processor module configured to execute instructions stored in non-volatile memory to fulfill the followings:
having the sensing circuit module detect periodically via the touch panel touching or approximating events and the electrical signals according to a first period;
having the sensing circuit module perform multiple electrical signal detections during an electrical signal scanning period, after the electrical signals are detected in a first time, in order to detect the electrical signals in a second time;
calculating a period of the electrical signal transmission of the transmitter according to the first time and the second time; and
having the sensing circuit module detect periodically via the touch panel touching or approximating events and the electrical signals according to the period of the electrical signal transmission of the transmitter,
wherein the first period is not an integer multiple of the period of the electrical signal transmission of the transmitter and wherein the period of the electrical signal transmission of the transmitter is not an integer multiple of the first period.

16. The touch system as claimed in claim 15, further comprises the transmitter.

* * * * *